United States Patent

Matsumura et al.

[11] Patent Number: 6,125,144
[45] Date of Patent: Sep. 26, 2000

[54] PICTURE CODING METHOD AND PICTURE CODER

[75] Inventors: Yasuko Matsumura; Toshihisa Nakai, both of Tokyo, Japan

[73] Assignee: Oki Electric Industry Co., Ltd., Tokyo, Japan

[21] Appl. No.: 08/924,262

[22] Filed: Sep. 5, 1997

[51] Int. Cl.[7] .............................. H04N 7/12; H04N 11/02; H04N 11/04

[52] U.S. Cl. ....................... 375/240.12; 348/409; 348/699

[58] Field of Search ..................... 348/699, 700, 348/420, 421, 411, 413, 409, 401, 397; H04N 7/12, 11/02, 11/04

[56] References Cited

U.S. PATENT DOCUMENTS

| | | |
|---|---|---|
| 4,689,671 | 8/1987 | Ohki et al. . |
| 4,837,618 | 6/1989 | Hatori et al. . |
| 5,136,378 | 8/1992 | Tsurube . |
| 5,260,783 | 11/1993 | Dixit ........................................ 348/415 |
| 5,387,938 | 2/1995 | Fukuda et al. . |
| 5,457,495 | 10/1995 | Hartung . |
| 5,805,223 | 9/1998 | Shikakura et al. ...................... 348/402 |
| 5,847,763 | 12/1998 | Matsumura et al. .................... 348/416 |
| 5,912,707 | 7/1999 | Kim ......................................... 348/415 |

FOREIGN PATENT DOCUMENTS 0 474 388 A2  3/1992  European Pat. Off. .

OTHER PUBLICATIONS

Yutaka Machida and Takeshi Ikutake, "ATM Picture Coding Method with Cell Discard Tolerance", 1992 Picture Coding Symposium.

*Primary Examiner*—Howard Britton
*Assistant Examiner*—Nhon T Diep
*Attorney, Agent, or Firm*—Wenderoth, Lind & Ponack, L.L.P.

[57] ABSTRACT

A picture coder and a picture coding method which quickly recover the degraded picture quality of partitions, which could not be decoded due to a data error or a data loss, without increasing the amount of coding. A picture coding method or a picture coder is operable for coding picture data of a frame which is divided into a plurality of partitions, each partition being coded in a temporal correlation coding method or in an intra-picture coding method, wherein one or more partitions are determined to be refreshed for each frame or for each plurality of frames and wherein partitions determined to be refreshed are coded in the intra-picture coding method. A temporal change amount for each partition is calculated and, based on the temporal change amount for each partition, one or more partitions are determined to be refreshed.

20 Claims, 15 Drawing Sheets

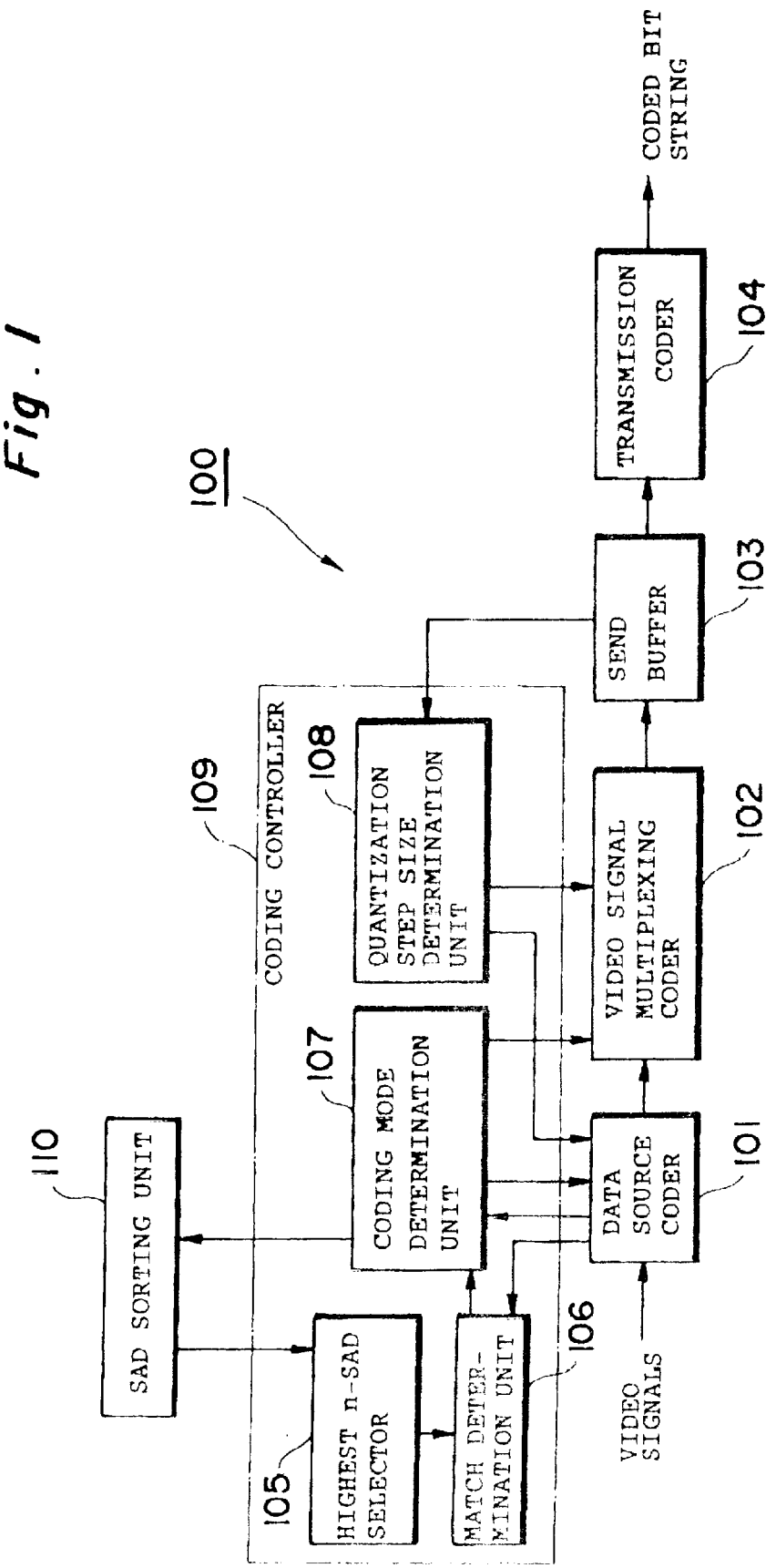

▨▨▨ : THREE MACRO BLOCKS TO BE REFRESHED AT A TIME

▨▨▨ : THREE MACRO BLOCKS TO BE REFRESHED AT A TIME

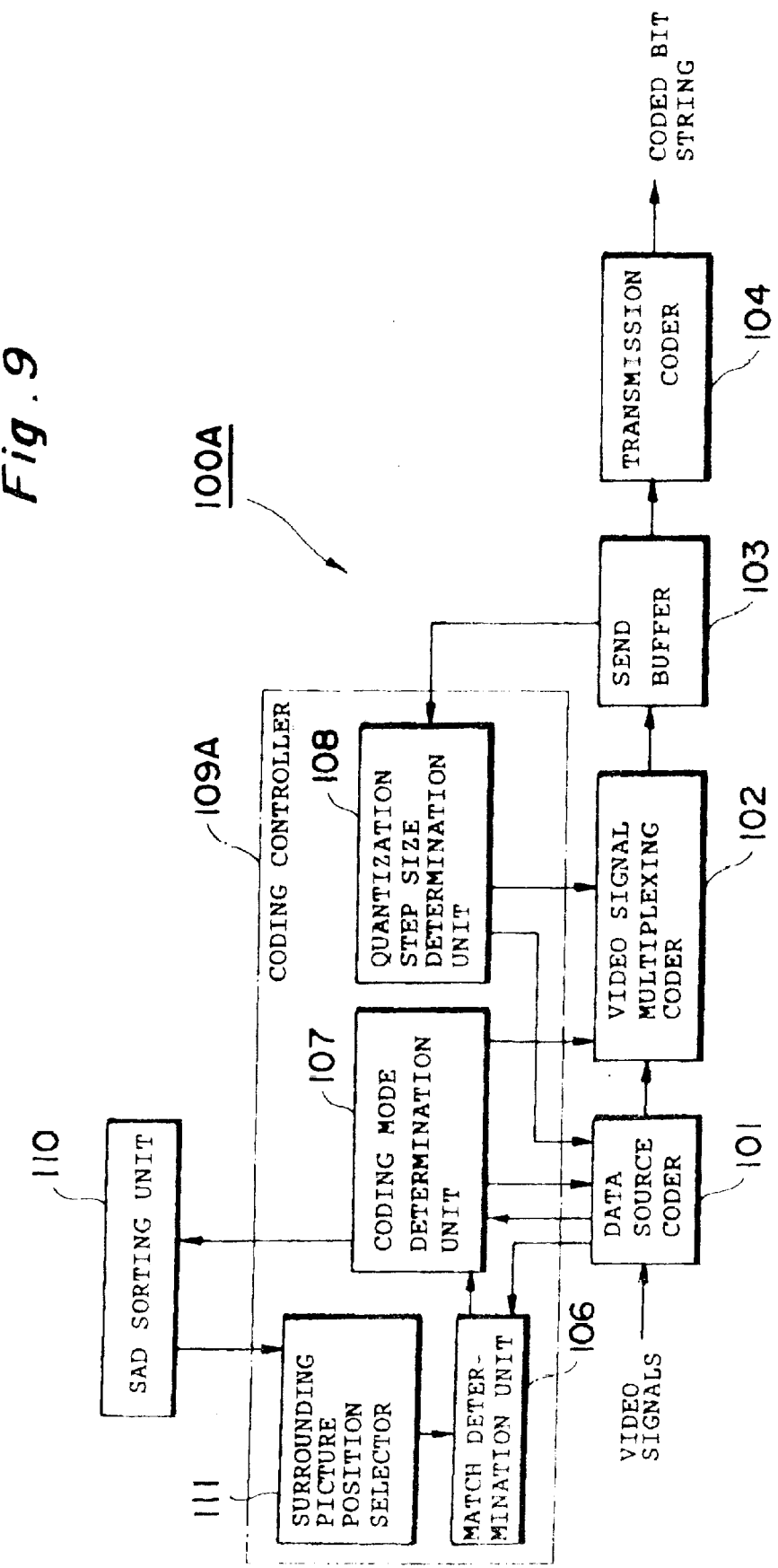

Fig.11(a)

| UPD7 | UPD2 | UPD9 |
|---|---|---|
| UPD4 | UPD1 = SADNO 0 | UPD5 |
| UPD6 | UPD3 | UPD8 |

SADNO[0] IS SURROUNDED BY MACRO BLOCKS

Fig.11(b)

| UPD7 | UPD2 | UPD9 |
|---|---|---|
| UPD4 | UPD1 | UPD5 |

UPD3=UPD6=UPD8=-1 SADNO[0] IS IN THE LEFTMOST COLUMN

Fig.11(c)

| UPD4 | UPD1 | UPD5 |
|---|---|---|
| UPD6 | UPD3 | UPD8 |

UPD2=UPD7=UPD9=-1 SADNO[0] IS IN THE RIGHTMOST COLUMN

Fig.11(d)

| UPD7 | UPC2 |
|---|---|
| UPD4 | UPD1 |
| UPD6 | UPD3 |

UPD5=UPD8=UPD9=-1 SADNO[0] IS IN THE BOTTOM ROW

Fig.11(e)

| UPD2 | UPD9 |
|---|---|
| UPD1 | UPD5 |
| UPD3 | UPD8 |

UPD5=UPD8=UPD9=-1 SADNO[0] IS IN THE TOP ROW

Fig. 12(a)

| UPD1 = SADNO[0] | UPD2 |
|---|---|
| UPD5 | UPD9 |

UPD3=UPD4=UPD6=UPD7=UPD8=-1
SADNO[0] IS IN THE UPPER-LEFT CORNER OF THE PICTURE

Fig. 12(b)

| UPD3 | UPD1 |
|---|---|
| UPD8 | UPD5 |

UPD2=UPD4=UPD6=UPD7=UPD9=-1
SADNO[0] IS IN THE UPPER-RIGHT CORNER OF THE PICTURE

Fig. 12(c)

| UPD4 | UPD7 |
|---|---|
| UPD1 | UPD2 |

UPD3=UPD5=UPD6=UPD8=UPD9=-1
SADNO[0] IS IN THE LOWER-LEFT CORNER OF THE PICTURE

Fig. 12(d)

| UPD6 | UPD4 |
|---|---|
| UPD3 | UPD1 |

UPD2=UPD5=UPD7=UPD8=UPD9=-1
SADNO[0] IS IN THE LOWER-RIGHT CORNER OF THE PICTURE

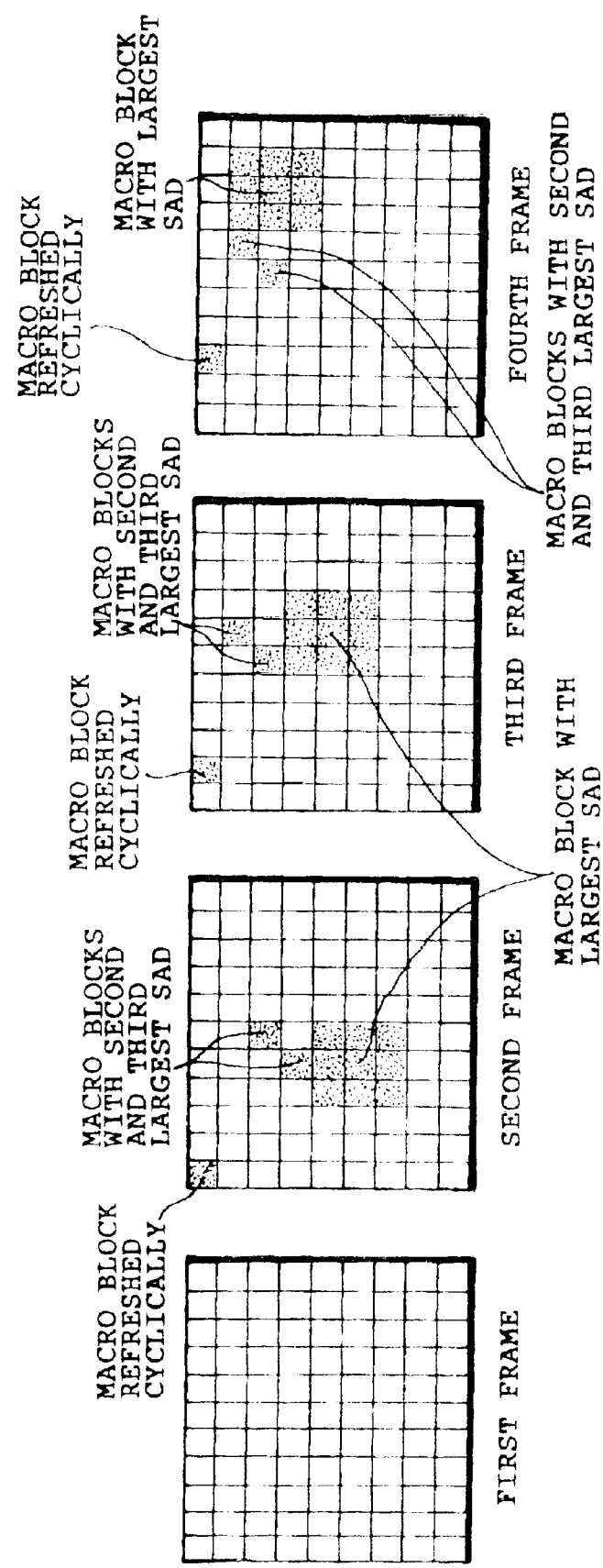

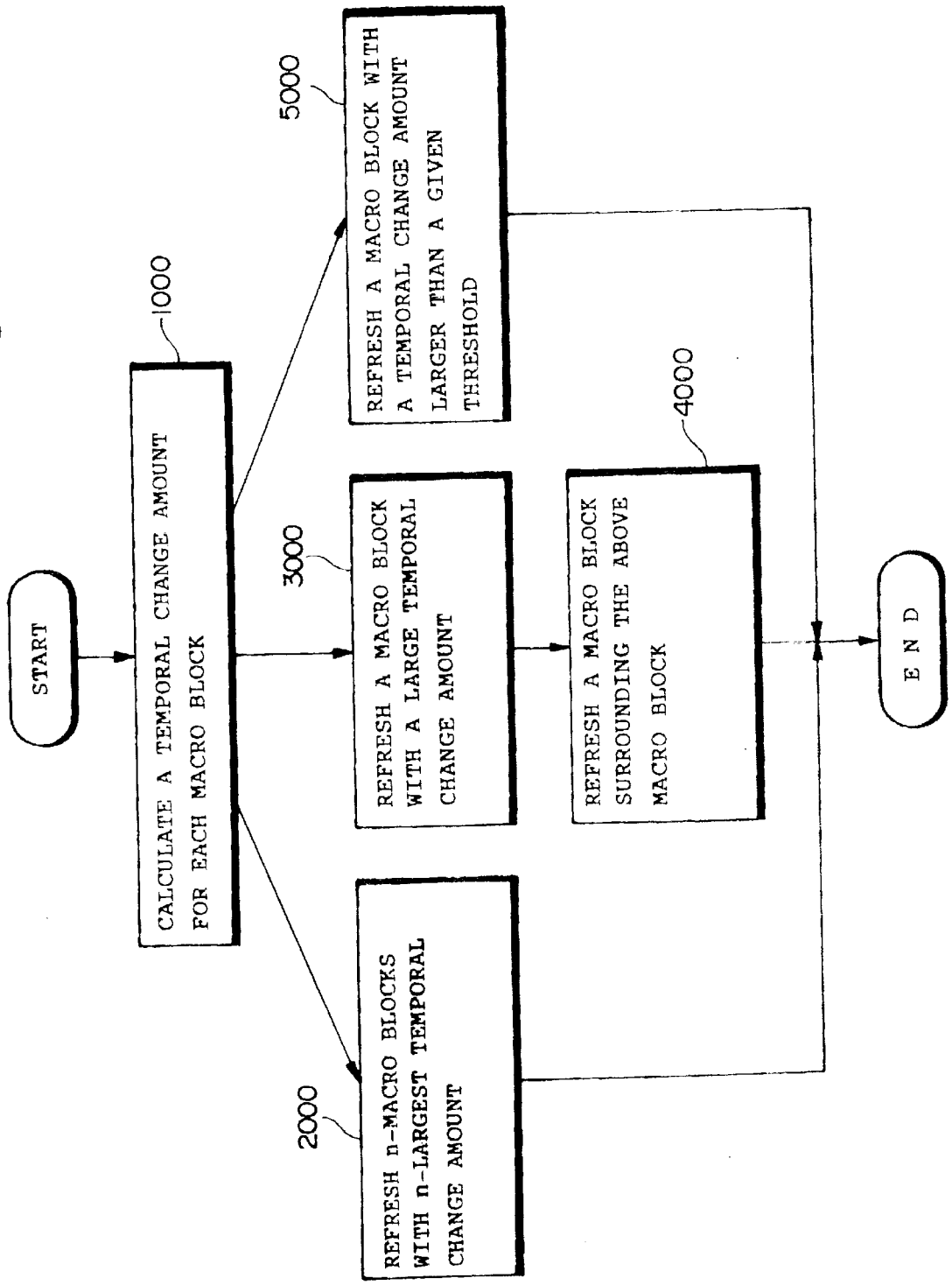

ns in the INTER mode in which only the inter-frame differential signals for the changes between two consecutive frames are coded, provides coding efficiency better than that of INTRA mode coding. And, INTRA mode coding that is performed for refreshment a picture partition (refreshment unit) involves an amount of coding larger than that in INTER mode coding. Therefore, refreshment which is done at the sacrifice of large amounts of coding must be able to guarantee better picture quality.

PICTURE CODING METHOD AND PICTURE CODER

BACKGROUND OF THE INVENTION

1. Field of the invention

The present invention relates to a picture coding method and a picture coder, and more particularly to an improvement in the refreshment function preventing a decoding error from affecting a plurality of continuous pictures.

2. Description of the prior art

Moving-picture data is compressed to reduce redundancy when sent over a digital communication network. In general, a standardized moving picture coding system (for example, a moving picture coding system in accordance with the ITU-T/H. 261 or MPEG2 algorithm) combines two coding methods: a method in which temporal redundancy is reduced by coding only the differences between two consecutive frames (hereinafter called inter-frame compression mode coding or INTER mode coding) and a method in which spatial redundancy is reduced by performing orthogonal transformation on a picture (hereinafter called intra-frame compression mode coding or INTRA mode coding) rather than coding the differences between two frames.

A standardized moving picture coding system, such as ITU-T/H. 261 or MPEG2, divides a unit of image data (frame) into a plurality of partitions each of equal size (for example, 16×16 pixels; in the following discussion, this partition is called a macro block), and performs coding on one macro block at a time. The system combines several coded macro block groups into another unit (for example, a unit separated by a dotted line in FIGS. 2(a) and 2(b) inserts a synchronization code word between each two consecutive macro block groups to establish the synchronization of variable-length coding. This type of unit (macro block group) is called a GOB (Group of Block) in ITU-T/H.261 or a slice in MPEG2. In the rest of this specification, this unit is called a slice.

The synchronization code word, provided for each slice in compressed data, limits the effect of a data error or a data loss on that slice only. In other words, though a slice cannot be decoded if a data error or a data loss occurs in that slice, the synchronization code word enables the subsequent slices to be decoded.

However, a data error or a data loss, which may occur in compressed moving-picture data coded in the INTER mode, significantly distorts the picture. In the INTER mode in which only the differences between the preceding frame and the current frame are coded, the distortion is propagated through the subsequent frames. For example, if there is no error in compressed data, the picture is decoded as shown in FIG. 2(a). On the other hand, if an error occurs, for example, in the fourth slice and, as a result, a part of the second frame cannot be decoded, the error is propagated not only in the second frame but also through the third and the following frames.

To prevent a distortion caused by an error (degraded picture quality) from being propagated through the subsequent frames, the coder regularly forces intra-frame compression mode coding (INTRA mode coding) in which a preceding frame is not referenced. This type of forced INTRA mode coding, initiated by the coder in this manner, is called refreshment. Refreshment is done on a slice basis (intra-slice refreshment) or on a frame basis (intra-frame slicing), as described in Reference 1. Refreshment is also done on a macro block basis although the name of the literature describing this method is not given here.

Reference 1: Yutaka Machida and Takeshi Ikutake "ATM Picture Coding Method with Cell Discard Tolerance", 1992 Picture Coding Symposium.

FIG. 3 illustrates traditional intra-slice refreshment. During intra-slice refreshment, a given number of slices (two slices in the figure) are refreshed cyclically within a frame, as shown in FIG. 3. FIG. 4 illustrates traditional refreshment on a macro block basis. During macro-block-basis refreshment, a given number of macro blocks (three slices in the figure) are refreshed cyclically within a frame, as shown in FIG. 4.

However, traditional refreshing has the problems described below whether refreshment is done on a frame basis, slice basis, or macro block basis.

(1) INTER mode coding, in which only the inter-frame differential signals for the changes between two consecutive frames are coded, provides coding efficiency better than that of INTRA mode coding. And, INTRA mode coding that is performed for refreshment a picture partition (refreshment unit) involves an amount of coding larger than that in INTER mode coding. Therefore, refreshment which is done at the sacrifice of large amounts of coding must be able to guarantee better picture quality.

When an error or a data loss is found in compressed data, data in the corresponding partition in a frame that was decoded correctly is usually used. For a partition containing a still picture, good quality is guaranteed even when a data error or data loss is found and therefore no refreshment is needed.

However, a traditional refresh method has refreshed the partitions of a frame cyclically or a frame itself, and refreshed data (INTRA mode coding) regardless of whether it is a moving picture or still picture. That is, the traditional method has refreshed all the pictures including those that guarantee good picture quality even if a data error or data loss occurs (for example, still pictures), thus resulting in additional coding and reduced transmission efficiency.

(2) When a data error or a data loss is found in compressed data in a moving-picture area as shown in FIG. 2(b), the picture quality is significantly reduced. Therefore, it is recommended that the propagation of reduced picture quality be stopped as soon as possible and that the refresh cycle be as short as possible. However, this solution is not practical because a short refresh cycle increases the amount of coding to be sent.

Thus, a moving-picture area degraded by a data error or data loss is not corrected until it is refreshed. In some cases, the degraded moving picture is incorrect for a long time.

SUMMARY OF THE INVENTION

To solve the above problems, one aspect of the present invention, is a method of coding picture data for a frame which is divided into a plurality of partitions, each partition being coded in a temporal correlation coding method or in an intra-picture coding method, wherein one or more partitions are determined to be refreshed for each frame or for each plurality of frames and wherein partitions determined to be refreshed are coded in the intra-picture coding method. The method comprises calculating a temporal change amount for each partition and determining, based on the temporal change amount for each partition, one or more partitions to be refreshed.

According to another aspect of the present invention, a picture coder includes picture coding means to divide a frame of data into a plurality of partitions and code each partition in a temporal correlation coding method or in an intra-picture coding method. The picture coder includes refresh target determination means for determining one or more partitions to be refreshed for each frame or for each plurality of frames, wherein the picture coding means code, in the intra-picture coding method, one or more partitions determined to be refreshed and wherein the refresh target determination means comprises the following components characterized as follows.

The refresh target determination means includes a change amount calculation module for calculating a temporal change amount for each partition; and a refresh target determination module for determining, based on the temporal change amount for each partition, one or more partitions to be refreshed.

The first and second inventions determine partitions to be refreshed, based on a temporal change amount of picture data. Thus, the picture quality, degraded by a data error or a data loss, may be recovered quickly through refreshment without affecting transmission efficiency.

BRIEF DESCRIPTION OF THE DRAWINGS

The present invention will be understood more fully from the detailed description and the accompanying drawings below of the preferred embodiments of the invention.

In the drawings:

FIG. 1 is a block diagram showing a configuration of a coder used in the first embodiment;

FIG. 9 is a block diagram showing a configuration of a coder used in the second embodiment;

FIGS. 11(a) to 11(e) are diagrams showing how surrounding macro blocks are identified in the second embodiment (1);

FIGS. 12(a) to 12(d) are diagrams showing how surrounding macro blocks are identified in the second embodiment (2);

FIG. 15 is a diagram showing another embodiment (1);

FIG. 17 shows a flowchart of a picture coding method according to the present invention.

DESCRIPTION OF THE PREFERRED EMBODIMENTS

Figure 2A:
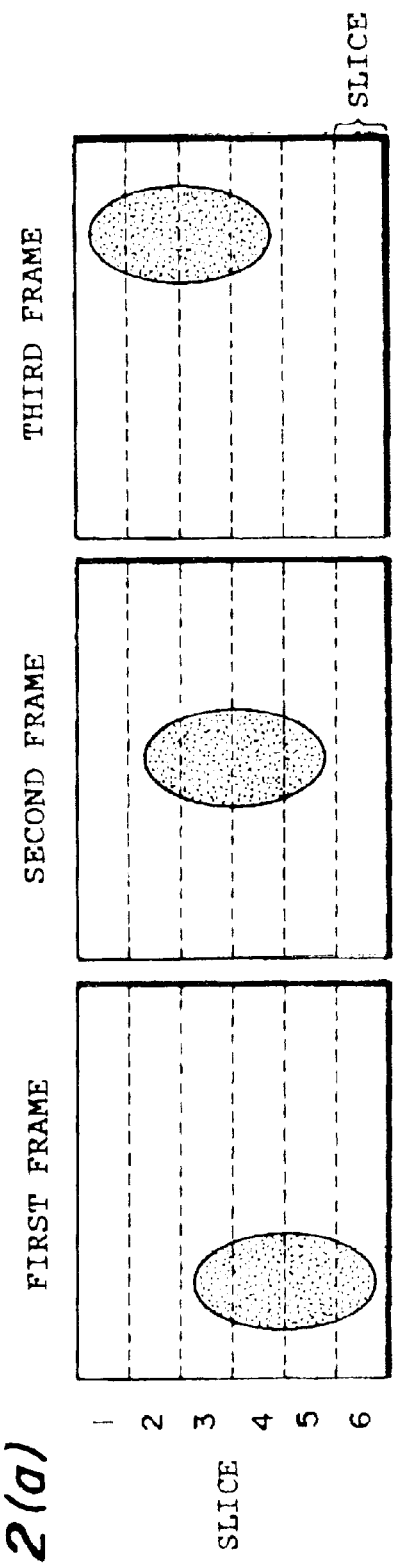
FIGS. 2(a) and 2(b) are diagrams showing why refresh operation is necessary.
Figure 2B:
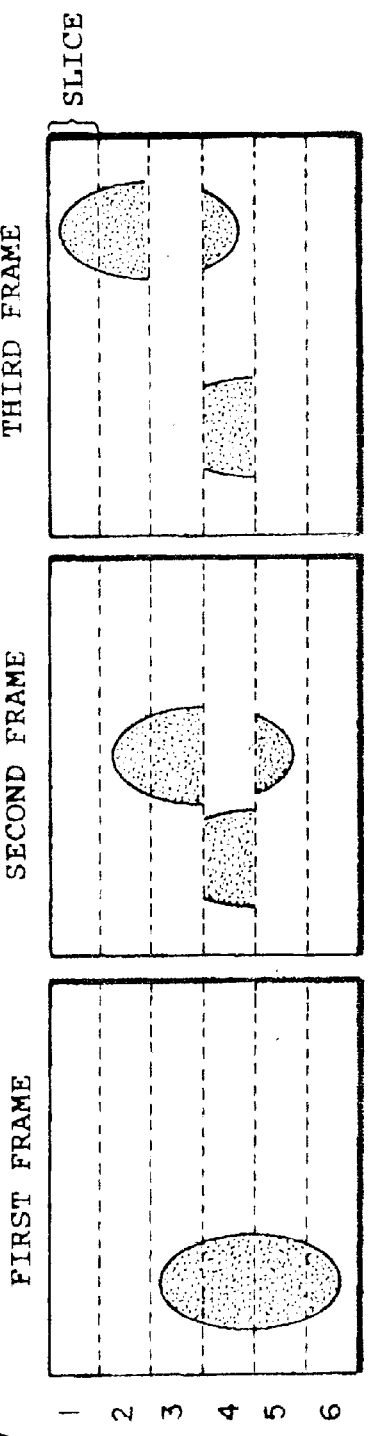

Hereinafter, the preferred embodiments of a picture coding method and a picture coder according to this invention will be now described with the accompanying drawings.

First of all, the picture coding method according to the present invention will be summarized for easy understanding of the detailed functions and configurations thereof and of the picture coder according to the present invention, with reference to FIG. 17.

As shown in FIG. 17, at first a temporal change amount is calculated for each macro block (step 1000). The procedure advances to three steps. At one of the steps, n-macro blocks with n-largest temporal change amounts are refreshed if its temporal change amount is large (step 2000). At another of the steps, a macro block with a large temporal change amount is refreshed similarly to the process of the step 2000 (step 3000), and further a macro block surrounding to the macro block having the large temporal change amount is refreshed (step 4000). At the other of the steps, a macro block with a temporal change amount which is larger than a predetermined threshold, is refreshed (step 5000).

(A) First embodiment

Referring to the attached drawings, there is shown the first embodiment of a picture coding method and a picture coder according to the present invention. Note that the first embodiment employs a method and a system conforming to MPEG2.

FIG. 1 is a block diagram showing a functional configuration of a picture coder used in the first embodiment.

A picture coder 100 shown in FIG. 1 comprises a data source coder 101, a video signal multiplexing coder 102, a send buffer 103, a transmission coder 104, coding controller 109, and an SAD sorting unit 110. The coding controller 109 comprises a highest n-SAD selector 105, a match determination unit 106, a coding mode determination unit 107, and a quantization step size determination unit 108.

Video signals (digital signals) are read, for example, from a video camera or a recording medium and are sent to the data source coder 101. The data source coder 101 codes the received signals in the INTER mode or INTRA mode.

Figure 5:
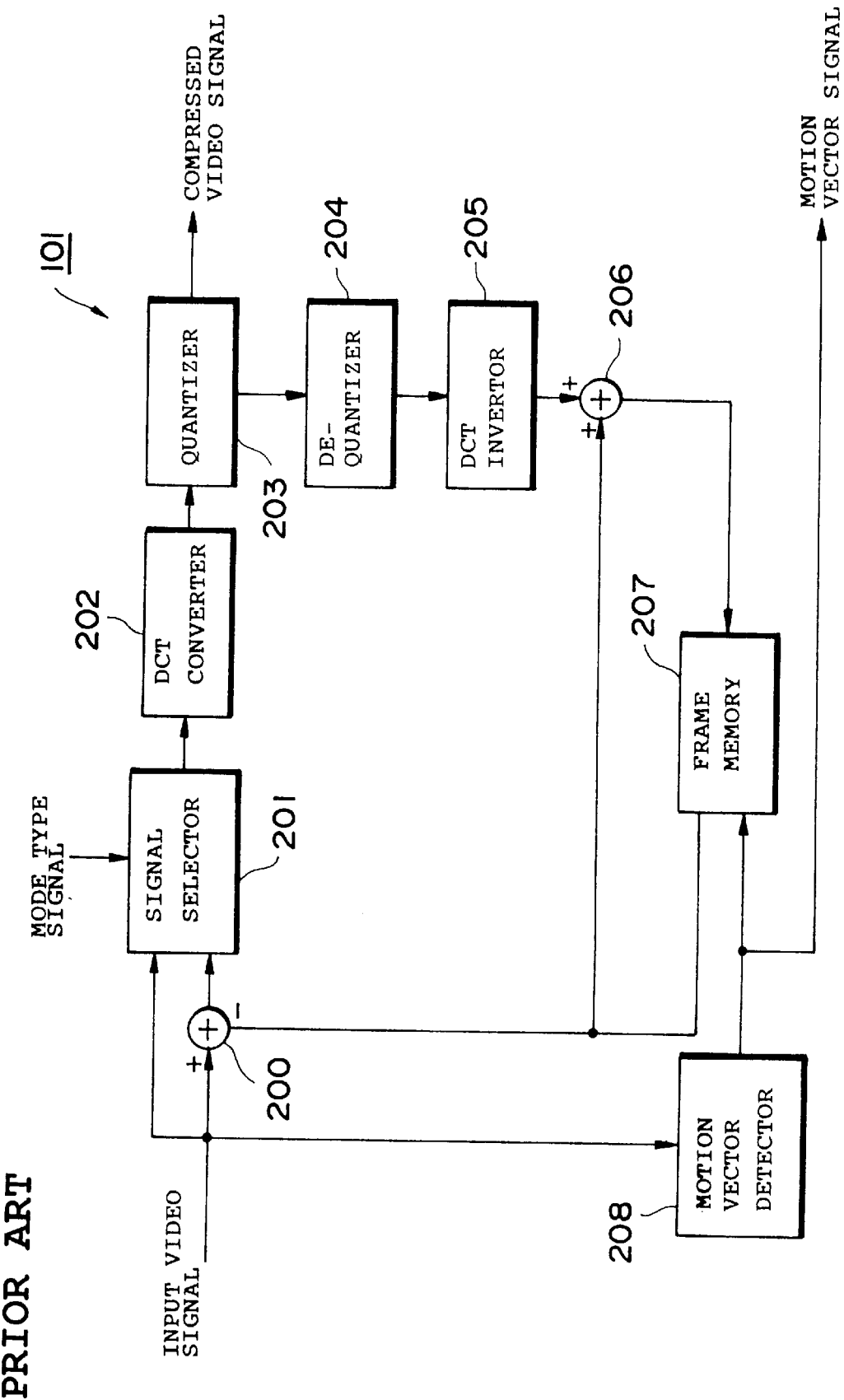
FIG. 5 is a block diagram showing an example of a detailed configuration of a data source coder used in the first embodiment.

FIG. 5 is a block diagram showing an example of a detailed configuration of the data source coder 101. The data source coder 101 divides input video signal data into a plurality of partitions, such as slices or blocks, and performs coding on each partition. Though not shown in the figure, the data source coder 101 has a processing circuit which identifies which macro block is being processed.

Received video signals shown in FIG. 5 are sent to a subtracter 200, a signal selector 201, and a motion vector detector 208. The subtracter 200 finds differential signals between the received video signals and the predicted video signals of the preceding frame obtained from a frame memory 207, and sends the differential signals to the signal selector 201. The signal selector 201, which receives a mode type signal from a coding mode determination unit 107, selects the differential signals from the subtracter 200 if the mode type signal indicates the INTER mode, and the received signals if the mode type signal indicates the INTRA mode. The signals from the signal selector are DCT-converted by a DCT converter (discrete cosine transform converter) 202, a type of orthogonal converter. Then the signals are quantized by a quantizer 203 and sent to the video signal multiplexing coder 102 as compressed video signals (coded data) and, at the same time, to a de-quantizer 204.

A quantization step size is given by a quantization step size determination unit 108 for use by the quantizer 203 and the de-quantizer 204.

Compressed video signals (coded data) are sent to the de-quantizer 204 and a DCT inverter 205, locally decoded there to output signals corresponding to the output signals from the signal selector 201, and then sent to an adder 206. Although the signal line is not shown in the figure, the mode type signal is sent from the coding mode determination unit 107 to the adder 206. When the mode type signal indicates the INTER mode, the adder 206 adds the local reproduction video signals of a preceding frame from the frame memory 207 to the output signal from the DCT inverter 205; when the mode type signal indicates the INTRA mode, the adder 206 allows the output signals from the DCT inverter 205 to be passed to the frame memory 207. The frame memory 207 contains the signals from the adder 206 as the signals (predicted video signals) of the preceding frame for use in coding of the next frame.

The motion vector detector 208 checks the input video signals if they contain a motion vector and, upon detection, sends a detection signal to the frame memory 207 and the video signal multiplexing coder 102. For example, with an area of 15×15 pixels as a search range, the motion vector detector 208 tries to find a motion vector with the minimum variance of the differential signals from the subtracter 200. The frame memory 207 is used for compensation based on a given motion vector during storage and read operation.

FIG. 5 is a block flowchart from the viewpoint of coding. In addition to the components shown in FIG. 5, the data source coder 101 has a plurality of processing function units, including a function unit which recognizes slices or macro blocks or a function unit which produces data for use in determining the coding mode (INTER mode or INTRA mode).

The video signal multiplexing coder 102 shown in FIG. 1 multiplexes a header, including a synchronization code word, onto the compressed signals (coded data) sent from the quantizer 203, completes a coded bitstream to be sent, and sends a resulting variable-length bitstream to the send buffer 103. The video signal multiplexing coder 102 also multiplexes onto the bitstream the mode type signal sent from the coding mode determination unit 107, a quantization step size sent from the quantization step size determination unit 108, and a motion vector signal sent from the motion vector detector 208. The transmission code string stored in the send buffer 103 is processed by the transmission bit-stream coder 104 for transmission. An error correction code such as a BCH code is used for the code bitstream that is sent over the transmission channel.

Information on the storage status of the send buffer 103 is sent to the quantization step size determination unit 108 to control the amount of coded data to be sent. Based on the storage status of the send buffer 103, the quantization step size determination unit 108 determines an optimum quantization step size at a particular point, and sends that information to the data source coder 101 (quantizer 203 and de-quantizer 204) and to the video signal multiplexing coder 102 as control signals, as described above.

The above-described components—data source coder 101 to transmission coder 104 and quantization step size determination unit 108—are the same as those in a conventional system.

The first embodiment is characterized by the components responsible for the refresh function including the highest n-SAD selector 105, match determination unit 106, coding mode determination unit 107, and SAD sorting unit 110.

A conventional system selects a frame or a partition (slices or macro blocks) for refreshment cyclically regardless of the type of picture data to be refreshed, while the first embodiment checks the type of data in a partition or a frame to be refreshed and, based on the result, selects a partition or frame. This is implemented by the highest n-SAD selector 105, match determination unit 106, coding mode determination unit 107, and SAD sorting unit 110. In the following description, assume that three macro blocks are refreshed in each frame.

As in a conventional system, the coding mode determination unit 107 receives from the data source coder 101 the information used to determine the compression coding mode (INTER mode or INTRA mode) to be used when a macro block is not refreshed. More specifically, the coding mode determination unit 107 receives two variances: the variance of input video signals (source data) representing all the pixels (N×M pixels: for example, 16×16 pixels) of a macro block (referred to as a source data variance) and the variance of the differential signals (prediction error data) of all the pixels of the macro block sent from the subtracter 200 (referred to as a motion compensation differential data variance which is the minimum variance of differential signals obtained during the search of best motion vectors). For a macro block not to be refreshed, the coding mode determination unit 107 compares the source data variance with the motion compensation differential data variance (each may be multiplied by a coefficient, or a coefficient may be added to a variance) to determine the compression mode to be used; INTER mode or INTRA mode. Because there is a high correlation between a frame of video signals and the next frame of video signals, the motion compensation differential data variance is small in most cases and, as a result, the INTER mode is used.

In addition to the source data variance and the motion compensation differential data variance described above, the coding mode determination unit 107 in the first embodiment receives another variance which is a variance of the differential signals (prediction error data) in each macro block sent from the subtracter 200 with the motion vector being 0 (referred to as position-fixed differential data variance which is abbreviated to SAD). This is different from a conventional system.

The position-fixed differential data variance (SAD) is a variance of the differential signals between two consecutive frames with the motion vector being 0. Therefore, this variance is larger when the macro block contains a moving picture, and is smaller when the macro block contains a still picture (is considered to be equal to the motion compensation differential data variance). In other words, when using a macro block in a position of the preceding frame in the corresponding position of the current frame, a larger position-fixed differential data variance (SAD) indicates that the image in the corresponding position of the current frame is distorted. Note that a position-fixed differential data variance need not necessarily be calculated according to the statistical definition; it may be calculated in some other way as described later.

For each macro block whose information is sent from the data source coder 101, the coding mode determination unit 107 sends the SAD to the SAD sorting unit 110.

The SAD sorting unit 110 receives the position-fixed differential data variance of each macro block from the coding mode determination unit 107 and, when the frame is completed, sorts the position-fixed differential data variances of all the macro blocks into descending sequence. Then, it outputs the sorted result to the highest n-SAD selector 105.

The highest n-SAD selector 105 selects the highest n (3 in this example) position-fixed differential data variances and outputs their macro block numbers to the match determination unit 106.

The match determination unit 106 stores n macro block numbers sent from the highest n-SAD selector 105 and checks if the number of a macro block to be coded by the data source coder 101 matches any of the stored n macro block numbers. When no match is found, the match determination unit 106 sends a mismatch signal to the coding mode determination unit 107; when a match is found, the match determination unit 106 sends a match signal to the coding mode determination unit 107.

Upon receiving the mismatch signal, the coding mode determination unit 107 compares the source data variance with the motion compensation differential data variance, as described above, to determine the coding mode (INTER mode or INTRA mode). On the other hand, upon receiving the match signal, the coding mode determination unit 107 determines that the macro block is to be coded in the INTRA mode (to be refreshed) regardless of the relation between the source data variance and the motion compensation differential data variance, and sends the mode type signal indicating the determined mode type to the data source coder 101.

In fact, the picture coder 100 comprises one or more semiconductor chips in many cases. It is not usually composed of hardware units, each with its own function, as shown in FIG. 1, but is composed of hardware units and software modules.

Operation of the picture coder 100, or processing of the picture coding method, used in the first embodiment is described with reference to the flowchart in FIG. 6. There is no correspondence between blocks 101 to 110 and the steps shown in the flowchart. Note that, in FIG. 6, three macro blocks are refreshed at a time in each frame. Also note that FIG. 6 shows not the whole picture coding processing but only processing associated with refresh operation executed in the first embodiment.

Figure 6:
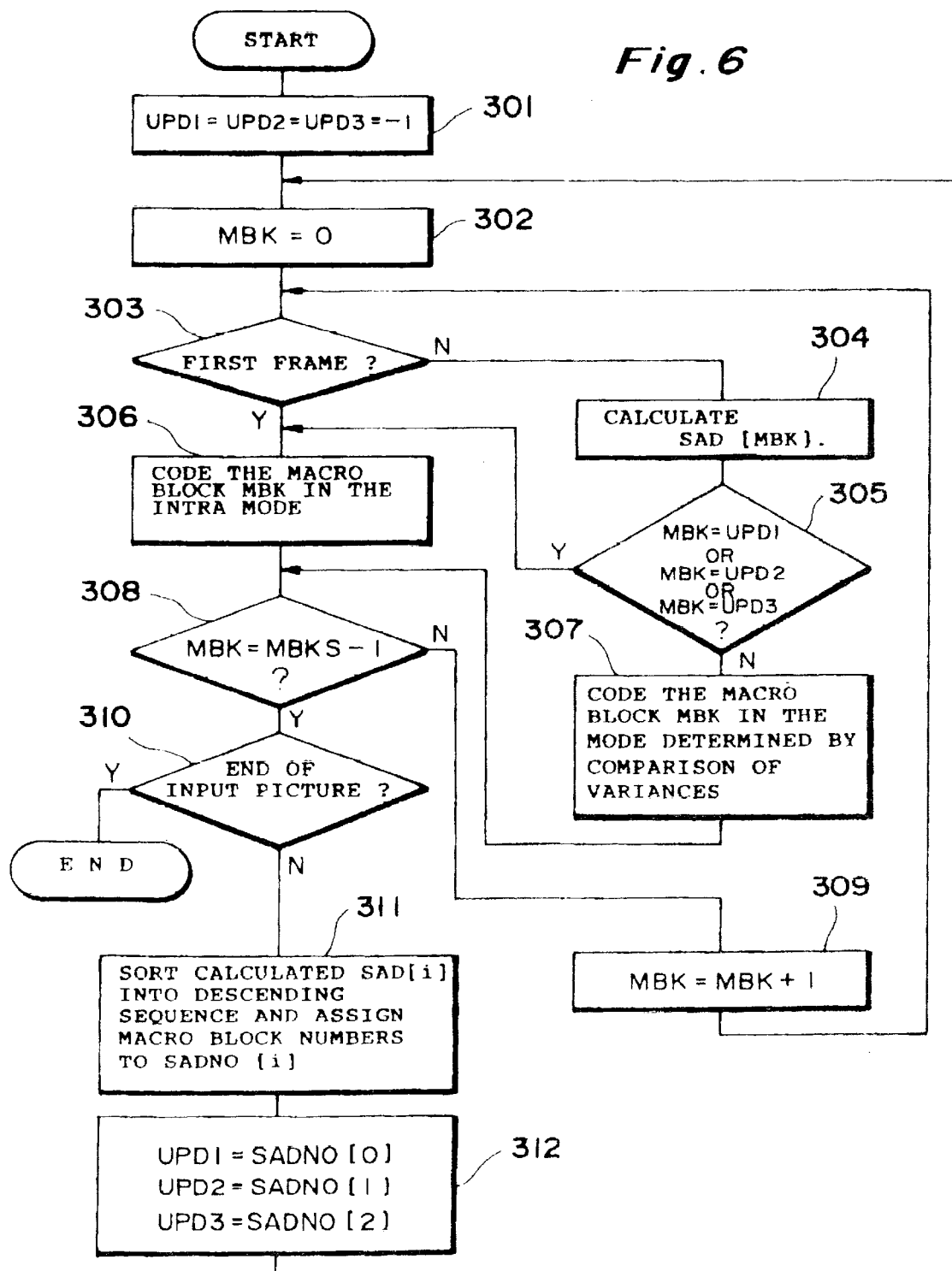
FIG. 6 is a flowchart showing the refreshment of the first embodiment.
Figure 7:
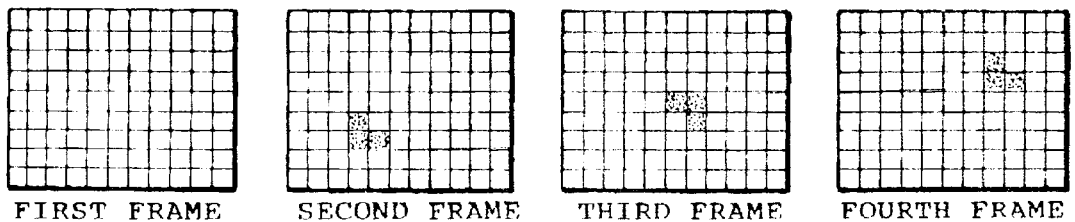
FIG. 7 is a diagram showing how macro blocks to be refreshed change.

When processing shown in FIG. 6 starts, three parameters (UPD1, UPD2, and UPD3) representing the numbers of macro blocks to be refreshed are set to a non-existing block number ("−1" is used in FIG. 6). (step 301). That is, clearing the parameters UPD1, UPD2, and UPD3 in this manner prevents any macro block from being refreshed until an existing macro block number is set.

When processing of a frame starts, the parameter MBK, which designates a macro block to be processed, is set to the initial value ("0": this indicates the first macro block). (step 302).

Then, a check is made to see if the frame to be refreshed is the first frame. (step 303)

If the frame is the first frame, the picture coder 100 codes the macro block specified by the parameter MBK in the INTRA mode (step 306). In this case, coding in the INTER mode is impossible because no difference between the preceding frame and the first frame may be obtained.

If the frame is not the first frame, the position-fixed differential data variance SAD [MBK] for the macro block to be processed is calculated (step 304). The position-fixed differential data variance SAD [i] for the differential picture signals for the current frame and the preceding frame may be calculated according to the definition of variance in statistics. For simplicity, it is more practical to calculate it as a sum of the absolute differential picture signal values of the corresponding positions (sum of the signal values for the pixels in the macro block) in the current frame and the preceding frame provided the sum is functionally equivalent to the variance.

When the position-fixed differential data variance SAD [MBK] is calculated and stored, a check is made to see if the parameter MBK matches any of the parameters UPD1, UPD2, and UPD3 (step 305). That is, this step checks if the macro block specified by the parameter MBK is one of macro blocks to be refreshed.

If the macro block is one of macro blocks to be refreshed, the picture coder 100 codes the macro block in the INTRA mode (step 306); otherwise, the picture coder 100 codes the macro block in the coding mode determined by comparing the source data variance and the motion compensation differential data variance (step 307).

The coding mode need not always be determined by the above-described coding mode that is similar to that of a conventional system. That is, because the position-fixed differential data variance SAD [MBK] is calculated in the first embodiment, the INTER mode or INTRA mode may be selected without using the motion compensation differential data variance; which coding mode is most suitable may be determined using the motion compensation differential data variance and the position-fixed differential data variance SAD [MBK]. The larger the position-fixed differential data variance SAD [MBK], the lower the correlation between the current frame and the preceding frame. This relationship may be used in determining the coding mode as described above.

Upon completion of macro block coding, the parameter MBK is compared with the number of macro blocks of a frame minus one to check if all the macro blocks of the frame have been coded (step 308). If the macro block just processed is not the last macro block of the frame, the parameter MBK is incremented by one to point to the next macro block (step 309) and then control goes back to step 303 to start processing for the next macro block.

The processing loop, step 303 to step 308, is repeated and, when the last macro block is coded (an equal comparison occurs in step 308), a check is made to see if the frame is the last frame, that is, if the end of input picture is reached (step 310).

If the frame is not the last frame, all the calculated position-fixed differential data variances SAD [i] (i=0 to MBKS−1) are sorted into descending sequence and the corresponding macro block numbers are assigned to the parameters SADNO [j] (step 311). For example, SADNO[0] is the number of the macro block with the largest position-fixed differential data variance SAD within the frame just coded, and SADNO [MBK−1] is the number of the macro block with the smallest position-fixed differential data variance SAD.

Then, the parameters SADNO [0], SADNO [1], and SADNO [2] are assigned to three parameters UPD1, UPD2, and UPD3, respectively, which specify the macro blocks to be refreshed. Control is then passed to step 302 (step 312) to process the next frame. That is, the numbers of the blocks with the highest three position-fixed differential data variances SAD in the frame just coded are reserved before going to the processing of the next frame.

For the first frame, the position-fixed differential data variance SAD is not calculated in step 304 and, therefore, steps 311 and 312 are omitted and control goes back directly to step 302. This is not shown in FIG. 6.

Figure 3:
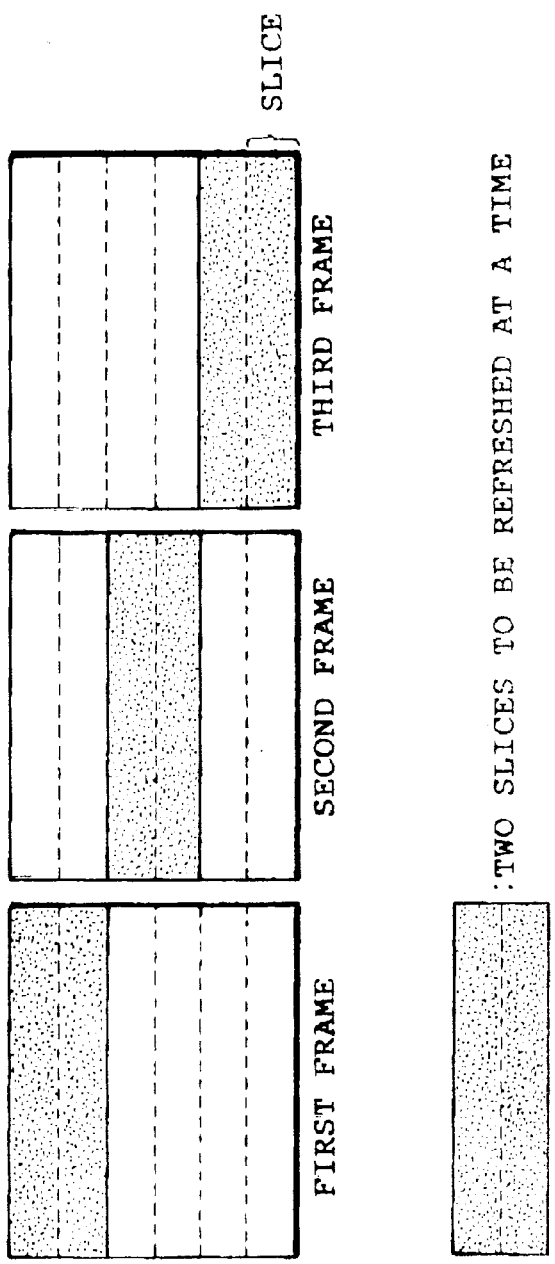
FIG. 3 is a diagram showing a conventional refresh method (1)
Figure 4:
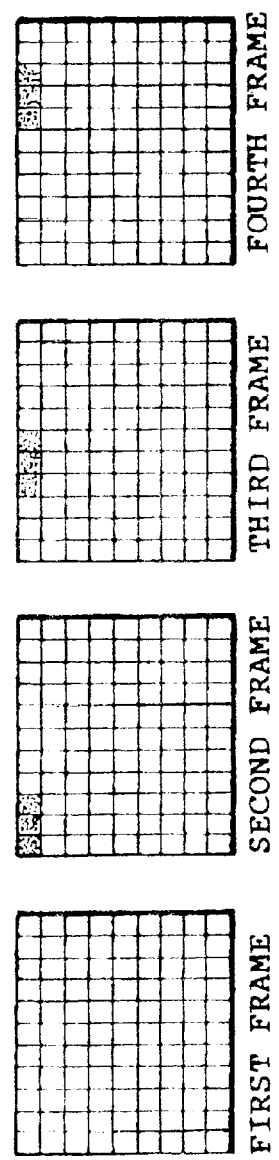
FIG. 4 is a diagram showing a conventional refresh method (2)
Figure 8A:
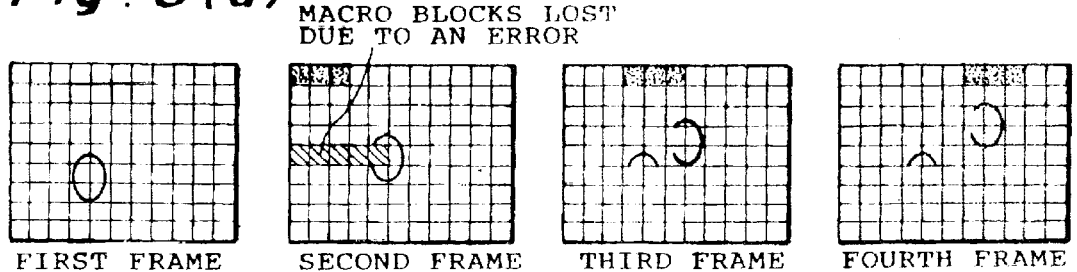
FIGS. 8(a) and 8(b) are diagrams showing an advantage of the first embodiment.
Figure 8B:
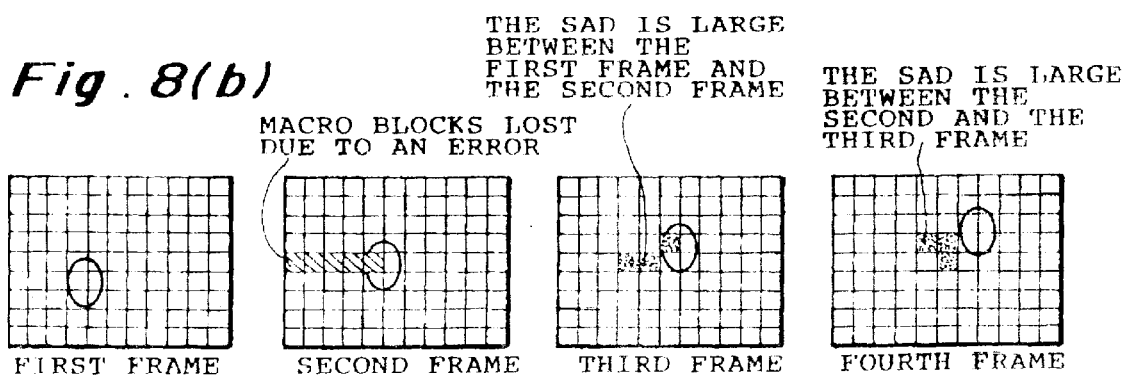

In the first embodiment, the macro blocks to be refreshed are not cycled regularly as in a conventional system (as shown in FIG. 3). Instead, the macro blocks with large position-fixed differential data variances SAD which correspond to macro blocks that change fast between two consecutive frames and which, if omitted, would significantly distort the picture, as shown in FIGS. 8(a) and 8(b) are selected in steps 311 and 312 as the macro blocks to be refreshed. In other words, the macro blocks with small position-fixed differential data variances SAD, such as those in the background, are not selected for refreshment because those macro blocks, if omitted, would not distort the picture significantly.

The processing loop composed of steps 302 to 312 is repeated and, when the processing of the last frame is finished and an equal comparison occurs in step 308, a sequence of coding processing shown in FIG. 6 is ended.

In the first embodiment, a macro block to be refreshed may be changed flexibly according to the contents of a picture as described above. Thus, even if a data error or a data loss occurs in the decoder and a macro block cannot be decoded, the quality of the macro block is ensured with the use of the signals of the macro block in the same position successfully decoded in the past.

That is, if a macro block in a still picture portion cannot be decoded because of a data error or a data loss, the signals of the macro block in the same position successfully decoded in the past are used to ensure good picture quality. Even if a data error or a data loss occurs in a moving picture portion that moves fast, the macro block is refreshed immediately to prevent the effect from lasting long and to improve degraded picture quality quickly.

FIGS. 8(a) and 8(b) explain the advantage of the first embodiment. FIG. 8 (a) shows a conventional picture coding method (refresh method), while FIG. 8 (b) shows the picture coding method (refresh method) of the first embodiment.

In the conventional method, a macro block is refreshed at a fixed interval. Therefore, if the decoder causes a data error or a data loss in first five macro blocks (part of which is in a moving picture) in the fifth slice of the second frame and uses the past signals for those macro blocks, the picture becomes distorted. It will take long to refresh the distorted portion and, therefore, the distorted decoded picture lasts long as shown in FIG. 8(a).

In the first embodiment, macro blocks with large position-fixed differential data variances SAD are selected for refreshment. So, even if a data error or a data loss is caused by the decoder in the fifth slice of the second frame as in the above case and the moving picture is distorted by the past signals, the corresponding moving part is coded in the INTRA mode for refreshment in the next frame (third frame) and the distorted part is corrected. This minimizes distorted frames (for example, only one frame in FIG. 8).

In the first embodiment, the number of macro blocks to be refreshed in a frame is the same as that in a conventional system, with no increase in the amount of coding (transmission efficiency not affected).

(B) Second embodiment

Referring to the attached drawings, there is shown the second embodiment of a picture coding method and a picture coder according to the present invention. Note that the second embodiment also employs a method and a system conforming to MPEG2.

FIG. 9 is a block diagram showing a functional configuration of a picture coder used in the second embodiment, with the corresponding components as those in FIG. 1 having the same numbers.

A picture coder 100A of the second embodiment shown in FIG. 9 also comprises a data source coder 101, a video signal multiplexing coder 102, a send buffer 103, a transmission coder 104, coding controller 109A, and a SAD sorting unit 110. However, a detailed configuration of the coding controller 109A is different from that of the first embodiment. That is, the coding controller 109A has a match determination unit 106, a coding mode determination unit 107, and a quantization step size determination unit 108, but does not have a highest n-SAD selector 105; it has a surrounding picture position selector 111 instead of the highest n-SAD selector 105.

The SAD sorting unit 110 used in the second embodiment receives position-fixed differential data variances (SAD) from the coding mode determination unit 107 and, upon termination of coding of one frame, sorts the position-fixed differential data variances of all the macro blocks in that frame into descending sequence. It then outputs the sorted result to the surrounding picture position selector 111.

The surrounding picture position selector 111 finds the number of a macro block with the largest position-fixed differential data variance (SAD), identifies the numbers of eight surrounding macro blocks, and outputs the numbers to the match determination unit 106. When a macro block with the largest position-fixed differential data variance (SAD) is on one of the sides, or in one of the corners, of the frame and there are not eight surrounding macro blocks, the surrounding picture position selector 111 identifies the macro block with the largest position-fixed differential data variance (SAD) and less than eight surrounding macro blocks and sends their numbers to the match determination unit 106.

The match determination unit 106 stores up to nine macro block numbers sent from the surrounding picture position selector 111 and checks if the number of a macro block to be coded matches one of the nine numbers stored in it. If none of the nine numbers matches the number of a macro block to be coded, the match determination unit 106 sends a mismatch signal; if one of the nine numbers matches the number of a macro block to be coded, the match determination unit 106 sends a match signal to the coding mode determination unit 107.

Except the function described above, the picture coder 100A in the second embodiment codes video signals in the same manner as the picture coder 100 in the first embodiment.

As described above, the macro blocks with the highest n position-fixed differential data variances (SAD) are refreshed with the use of the highest n-SAD selector 105 in the first embodiment, while a macro block with the largest position-fixed differential data variance (SAD) and the surrounding macro blocks are refreshed in the second embodiment.

Figure 10:
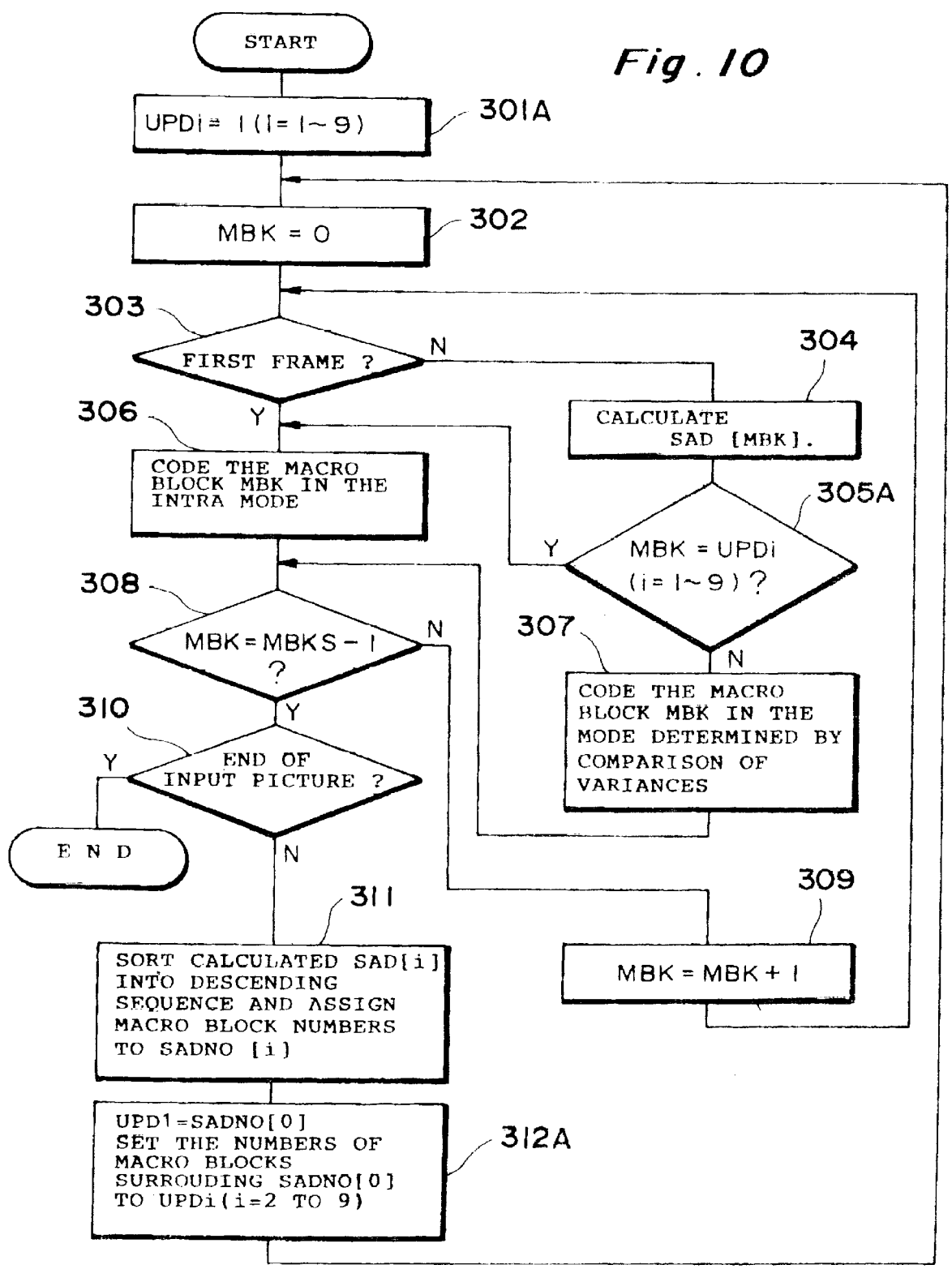
FIG. 10 is a flowchart showing the refreshment of the second embodiment.

Operation of the picture coder 100A, or processing of the picture coding method, used in the second embodiment is described with reference to the flowchart in FIG. 10. There is no correspondence between blocks 101 to 111 and the steps shown in the flowchart. In FIG. 10, the steps corresponding to those in FIG. 6 have the numbers used in FIG. 6. In addition, FIG. 10 shows only processing associated with refreshment operation specific to the second embodiment.

As shown in FIGS. 10 and 6, processing in the first embodiment is basically the same as that in the second embodiment, except steps 301, 305, and 312 in the first embodiment are modified in the second embodiment (steps 301A, 305A, and 312A in the second embodiment).

When processing shown in FIG. 10 starts, nine parameters (UPD1 to UPD9) representing the numbers of macro blocks to be refreshed are set to a non-existing block number ("−1"). (step 301A). As described above, up to nine macro blocks may be refreshed at a time in the second embodiment, there are nine parameters representing macro block numbers.

When parameters UPD1 to UPD9 are initialized, the first frame is coded in the INTRA mode; that is, each macro block in the first frame is refreshed by incrementing the macro block number parameter MBK by one at a time (step 302 and a loop composed of steps 303, 306, 308, 309 and 303). For the first frame, a position-fixed differential data variance (SAD) is not calculated, sorting is not performed, and no macro block is selected for refreshment (steps 311 and 312A are not executed). After all the macro blocks of the first frame are coded, processing for the second frame starts.

For the second and the following frames, a macro block is switched to the next one by incrementing the macro block number parameter MBK, a position-fixed differential data variance (SAD) is calculated for each macro block, a check is made if the macro block is to be refreshed, and the macro block is coded either in the INTER mode or in the INTRA mode (step 302 and a loop composed of steps 303, 304, 305A, 306 (or 307), 308, 309, and 303). Because up to nine macro blocks are refreshed at a time in the second embodiment, the check to see if a macro block is to be refreshed (step 305A) is somewhat different from that in the first embodiment.

For the second frame, the parameters UPD1 to UPD9 remain initialized and therefore no equal condition occurs in step 305A. The coding mode is determined by comparing variances as in a conventional system (step 307).

For the third and following frames, parameters UPD1 to UPD9 contain valid values and those parameters may determine macro blocks to be refreshed (step 306).

For the second and following frames, position-fixed differential data variances (SAD) are sorted (step 311) after all the macro blocks of a frame are coded as in the first embodiment. However, the first embodiment and the second embodiment differ in how macro blocks to be refreshed in the next frame are selected (step 312A).

In the second embodiment, the number of a macro block with the largest position-fixed differential data variance SADNO [0] is set in the parameter UPD1, with the numbers of eight macro blocks surrounding SADNO [0] in the parameters UPD2 to UPD9. FIGS. 11 (a) to (e) and FIGS. 12 (a) to (d) show how the parameters UPD1 to UPD9 are updated according to the sort result (SADNO [0]) obtained in step 312A. The figures show the parameters UPD1 to UPD9 depend on where a macro block with the largest macro block number SADNO is located within the frame. This is not described here in detail because it is not significant.

In either way, in step 312A, a macro block with the largest position-fixed differential data variance (SAD) and up to eight surrounding macro blocks are selected for refreshment in the next frame. When the next frame is coded, the selected macro blocks are coded (refreshed) in the INTRA mode.

Figure 13:
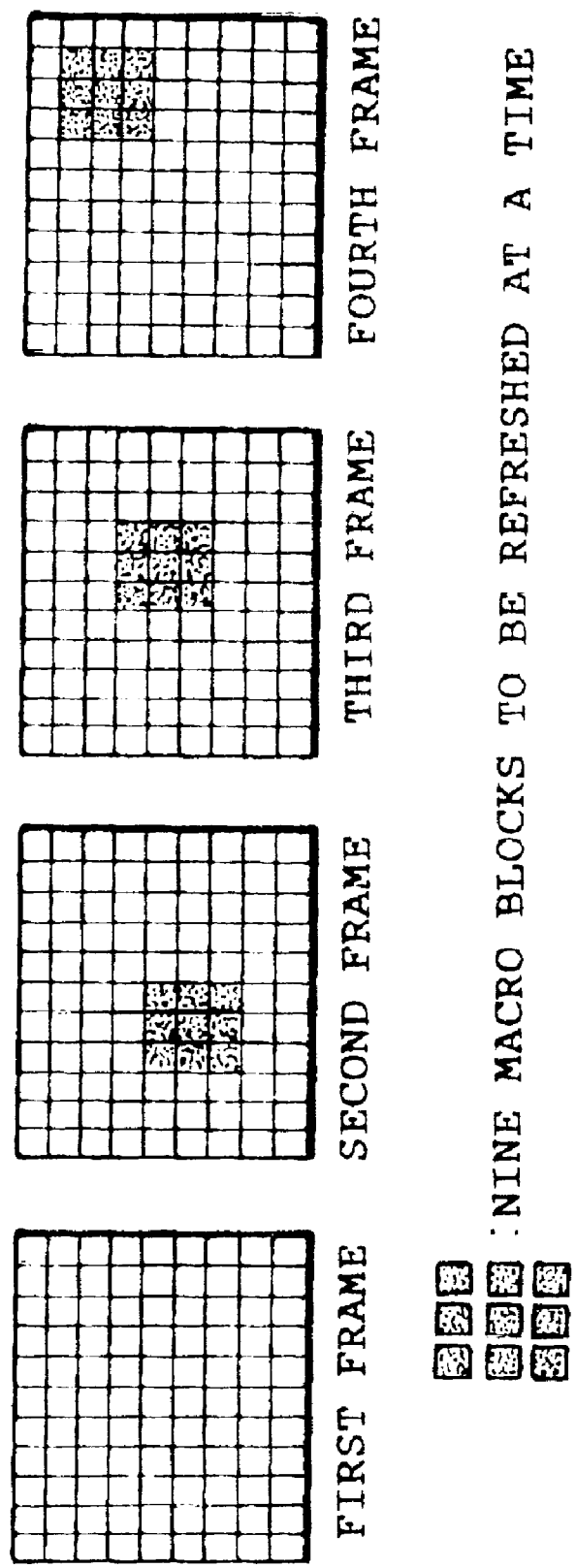
FIG. 13 is a diagram showing how macro blocks to be refreshed change.

In the second embodiment, macro blocks to be refreshed are not cycled within a frame but are selected dynamically, as shown in FIG. 13, according to how much the contents of macro blocks change.

Because a moving picture portion usually extends across more than one macro block, a distortion caused by a data error or a data loss is not corrected, in most cases, by refreshing only one macro block that is most affected by the error. Therefore, in the second embodiment, a macro block with the largest position-fixed differential data variance (SAD) and the macro blocks surrounding it are refreshed.

In the second embodiment, a macro block to be refreshed may also be changed flexibly according to the contents of a picture as described above. Thus, even if a data error or a data loss is caused in the decoder and a macro block cannot be decoded, the quality of the macro block is ensured with the use of the signals of the macro block in the same position successfully decoded in the past. That is, if a macro block in a still picture portion cannot be decoded because of a data error or a data loss, the signals of the macro block in the same position successfully decoded in the past are used to ensure good picture quality. Even if a data error or a data loss occurs in a moving picture portion that moves fast, the macro block is refreshed immediately to prevent the effect from lasting long and to improve degraded picture quality quickly.

In the second embodiment, not only a macro block with the largest position-fixed differential data variance (SAD) but also the surrounding macro blocks are refreshed. This minimizes degradation caused by a decoding error.

If a macro block cannot be decoded due to a data error or a data loss (the past signals must be used to decode it), the macro block is surrounded, in many cases, by a plurality of macro blocks which can be decoded but whose quality is poor (macro blocks that have been decoded in a usual way without noticing the data error or data loss). The refresh function quickly prevents picture quality degradation caused by a decoding error.

Figure 14A:
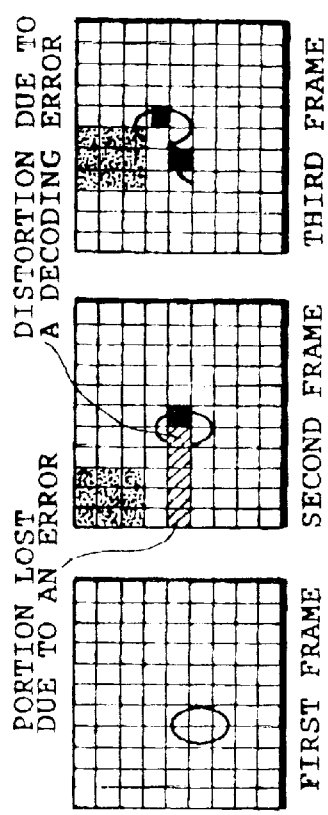
FIGS. 14(a) and 14(b) are diagrams showing an advantage of the second embodiment.
Figure 14B:
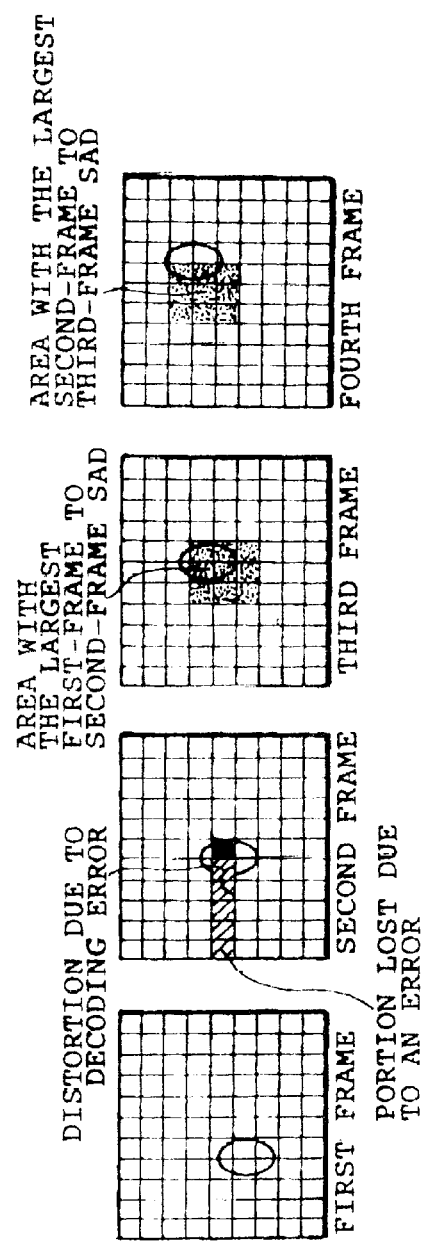

FIGS. 14(a) and 14(b) show the effect of the second embodiment. FIG. 14 (a) shows the refreshment of a conventional system, while FIG. 14 (b) shows the refreshment of the second embodiment. A black macro block is a macro block in which a decoding error occurred. FIGS. 14(a) and 14(b) indicate that the picture quality of an error macro block is recovered in the second embodiment sooner than in a conventional system.

In the second embodiment, the number of macro blocks to be refreshed in a frame is the same as that in a conventional system, with no increase in the amount of coding depending upon how many macro blocks are used in refreshment.

(C) Other embodiments

Although picture data is decoded in units of macro blocks in each of the above embodiments, other units such as a slice may also be used (a unit smaller than a macro block may also be used). In addition, the number of partitions to be refreshed in a frame is not limited to that used in the above embodiment. This invention may be used when the refresh unit is a frame. Accordingly it should be understood that the present invention includes frame-basis refreshment.

Although the number of refreshment units is fixed in each of the above embodiments (in the second embodiment, the number is basically fixed), it may vary among frames. For example, as a variant of the first embodiment, all the partitions with a position-fixed differential data variance (SAD) exceeding a threshold may be refreshed. Also, as a variant of the second embodiment, a partition with the largest position-fixed differential data variance (SAD) and the surrounding partitions with a position-fixed differential data variance (SAD) exceeding a threshold may be refreshed.

The refreshment method of the first embodiment may be combined with that of a conventional system or with that of the second embodiment. Similarly, the refreshment method of the second embodiment may be combined with that of a conventional system. FIG. 15 shows an example of a combination in which three refreshment methods are combined: the refreshment methods of the first embodiment, the second embodiment, and a conventional system. The figure shows how partitions (macro blocks) to be refreshed change.

In the above embodiments, a position-fixed differential data variance (SAD), which is used to select a partition to be refreshed, is generated from data in the two immediately-preceding frames; it may be generated by data in the current frame and the immediately-preceding frame; it may also be generated by data in three or more frames. In addition, a position-fixed differential data variance (SAD) need not always be a variance defined in statistics but may be a sum of differential absolute values, as described above. For example, it may be a differential absolute value between the average of the macro block values in the current frame and the average of the macro block values in the preceding frame. In other words, a value used to select a macro block to be refreshed may be any value which can used to find a macro block which had to be recovered by the past decoding signals because a data error or a data loss occurred during decoding. For example, it may be a value which is difficult to refresh when it becomes large.

Figure 16:
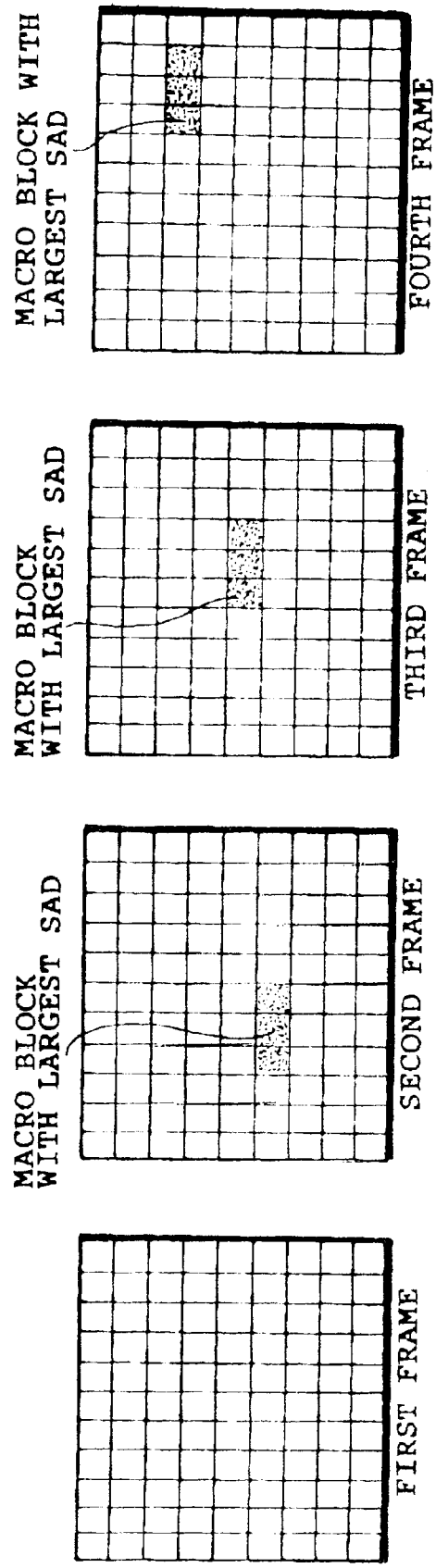
FIG. 16 is a diagram showing another embodiment (2)

In the second embodiment, a partition with the largest position-fixed differential data variance (SAD) and the surrounding eight partitions are refreshed. The number of surrounding partitions may be less than or greater than eight. For example, not only eight surrounding partitions but also twenty-four (8 plus 16) surrounding partitions may be refreshed; conversely, only the partitions in a specified direction (for example, vertical or horizontal direction) may be refreshed. In FIG. 16, only the surrounding partitions in the horizontal direction are refreshed.

In the above embodiments, partitions to be refreshed are selected for each frame. They may be selected once for several frames.

In the above embodiments, the coding mode is decided for a macro block that is not to be refreshed. Conversely, the coding mode of a macro block may be decided first and, only when the macro block is to be coded in INTER mode, a check may be made to see if the macro block is to be refreshed based on a position-fixed differential data variance (SAD).

The above embodiments assume a picture coder and a method conforming to MPEG2. The present invention is not limited to a system or a method according to this algorithm but may be applied to a coder and a coding method which combines a coding method using an inter-frame correlation (this is referred to as a temporal correlation coding method and a coding method which does not use past frame data (this is referred to as intra-picture coding method.

In this case, neither the temporal correlation coding method nor the intra-picture coding method is limited to the method used in the above embodiments. For example, as the temporal correlation coding method, not only one frame but also past several frames may be used to generate prediction signals or a correlation not only between frames but between fields may be used; as the intra-picture coding method, a coding method such as a method using a line correlation may be used. Therefore, how to divide a picture frame into several partitions and the motion vector search range are not limited to those described in the above embodiments.

The present invention may also be applied to a picture coder and a method which basically uses the temporal correlation coding method except for refreshment.

The picture coder and method according to the present invention calculate a temporal change amount for each partition and, based on that result, determine the partitions to be refreshed. Therefore, even when the picture quality is significantly degraded due a data error or a data loss that occurred during decoding, the picture coder and method according to the present invention can improve the degraded picture quality through refreshment without increasing the amount of coding.

What is claimed is:

1. A method of coding picture data of a frame which is divided into a plurality of partitions, each partition being coded in a temporal correlation coding method or in an intra-picture coding method, wherein partitions determined to be refreshed are coded in an intra-picture coding method, said method of coding picture data comprising:

calculating a temporal change amount between preceding coded frames for each partition, wherein the preceding frames do not include the frame to be coded; and determining one or more corresponding partitions in the frame to be coded to be refreshed, based on the temporal change amount for each partition.

2. A method of coding picture data as set forth in claim 1, wherein the temporal change amount is a sum of differential absolute values of all the pixel positions of a partition between two frames immediately preceding a frame to be coded.

3. A method of coding picture data as set forth in claim 1, wherein a specified number of partitions with largest temporal change amounts are determined as partitions to be refreshed.

4. A method of coding picture data as set forth in claim 1, wherein all partitions, each with a temporal change amount larger than a threshold, are determined as partitions to be refreshed.

5. A method of coding picture data as set forth in claim 1, wherein one or more partitions with largest temporal change amounts and surrounding partitions are determined as partitions to be refreshed.

6. A method of coding picture data of a frame as set forth in claim 1, further comprising:

calculating a predicting error data between preceding coded frames and a frame to be coded for each partition; and determining one or more partitions in the frame to be coded to be refreshed, based on the predicting error data for each partition.

7. A method of coding picture data as set forth in claim 6, wherein the temporal change amount is sum of differential absolute values of all the pixel positions of a partition between two frames immediately preceding a frame to be coded.

8. A method of coding picture data as set forth in claim 6, wherein a specified number of partitions with largest temporal change amounts are determined as partitions to be refreshed.

9. A method of coding picture data as set forth in claim 6, wherein all partitions, each with a temporal change amount larger than a threshold, are determined as partitions to be refreshed.

10. A method of coding picture data as set forth in claim 11, wherein one or more partitions with largest temporal change amounts and surrounding partitions are determined as partitions to be refreshed.

11. A picture coder comprising:

picture coding means for dividing a frame of data into a plurality of partitions, coding each partition in a temporal correlation coding method or in an intra-picture coding method, and coding, in the intra-picture coding method, one or more partitions determined to be refreshed;

a change amount calculation module operable to calculate a temporal change amount between preceding coded frames for each partition, wherein the preceding frames do not include the frame to be coded; and a refresh target determination module operable to determine, based on the temporal change amount for each partition, one or more corresponding partitions in the frame to be coded to be refreshed.

12. A picture coder as set forth in claim 11, wherein the temporal change amount is a sum of different absolute values of all the pixel positions of a partition between two frames immediately preceding a frame to be coded.

13. A picture coder as set forth in claim 11, wherein the refresh target determination module is operable to determine a specified number of partitions with largest temporal change amounts as partitions to be refreshed.

14. A picture coder as set forth in claim 11, wherein the refresh target determination module is operable to determine all partitions, each with a temporal change amount larger than a threshold, as partitions to be refreshed.

15. A picture coder as set forth in claim 11, wherein the refresh target determination module is operable to determine one or more partitions with largest temporal change amounts and surrounding partitions as partitions to be refreshed.

16. A picture coder as set forth in claim 11, further comprising:

a change amount calculation module operable to calculate a predicting error data between preceding coded frames and a frame to be coded for each partition; and a refresh target determination module operable to determine, based on the predicting error data for each partition, one or more partitions in the frame to be coded to be refreshed.

17. A picture coder as set forth in claim 16, wherein the temporal change amount is a sum of differential absolute values of all the pixel positions of a partition between two frames immediately preceding a frame to be coded.

18. A picture coder as set forth in claim 16, wherein the refresh target determination module is operable to determine a specified number of partitions with largest temporal change amounts as partitions to be refreshed.

19. A picture coder as set forth in claim 16, wherein the refresh target determination module is operable to determine all partitions, each with a temporal change amount larger than a threshold, as partitions to be refreshed.

20. A picture coder as set forth in claim 16, wherein the refresh target determination module is operable to determine one or more partitions with largest temporal change amounts and surrounding partitions as partitions to be refreshed.

* * * * *

UNITED STATES PATENT AND TRADEMARK OFFICE
CERTIFICATE OF CORRECTION

PATENT NO. : 6,125,144
DATED : September 26, 2000
INVENTOR(S) : Yasuko MATSUMURA et al.

It is certified that error appears in the above-identified patent and that said Letters Patent is hereby corrected as shown below:

In claim 10, column 14, line 46 of the printed patent, change "11" to --6--.

Signed and Sealed this

Twenty-second Day of May, 2001

*Attest:*

NICHOLAS P. GODICI

*Attesting Officer*     Acting Director of the United States Patent and Trademark Office